United States Patent Office 2,742,180
Patented Apr. 17, 1956

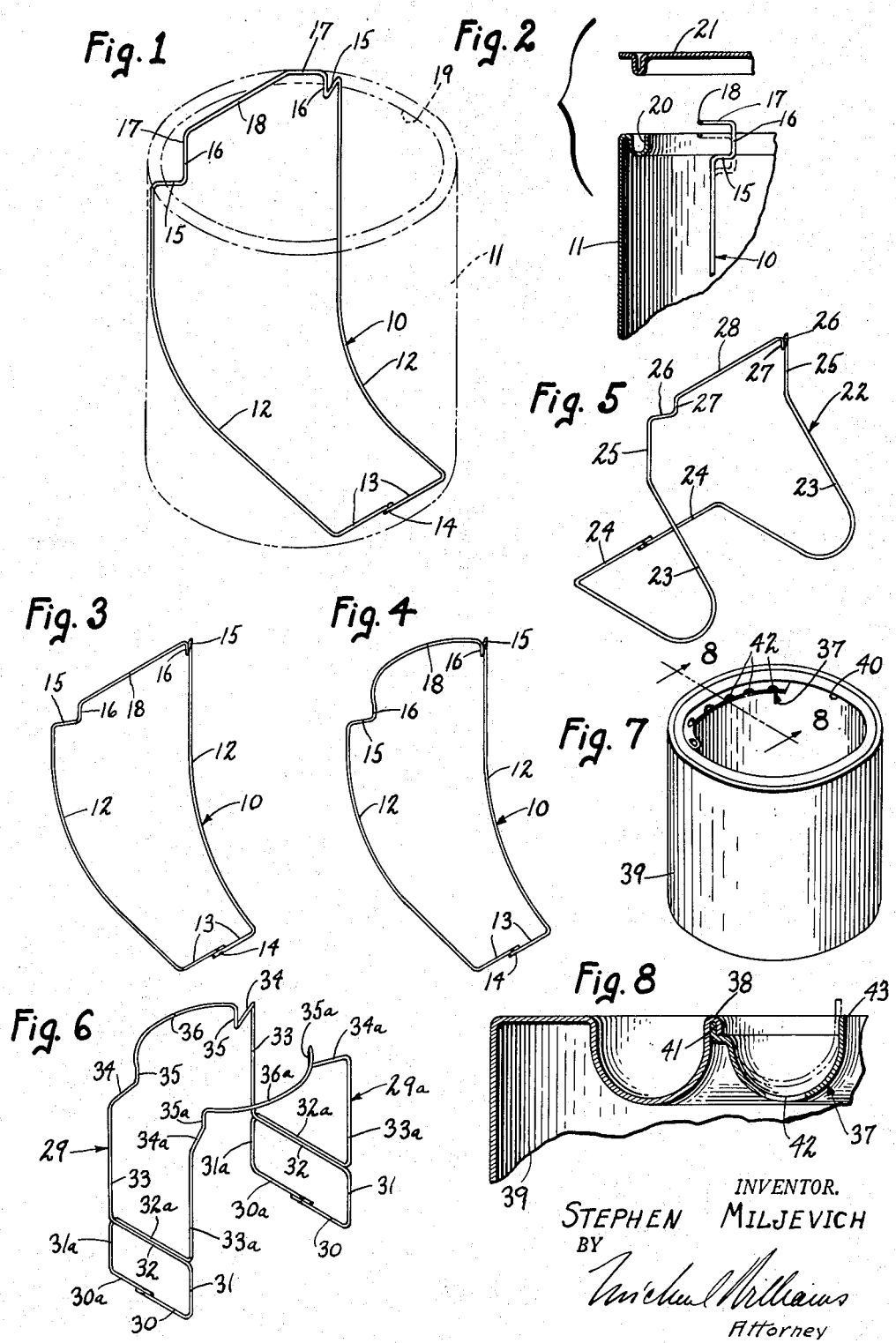

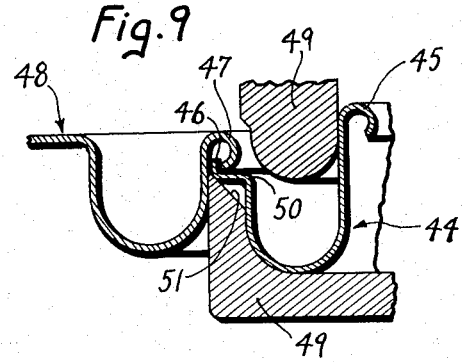
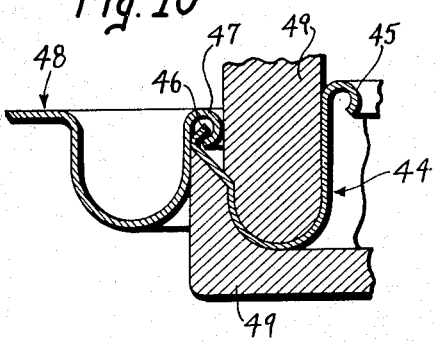
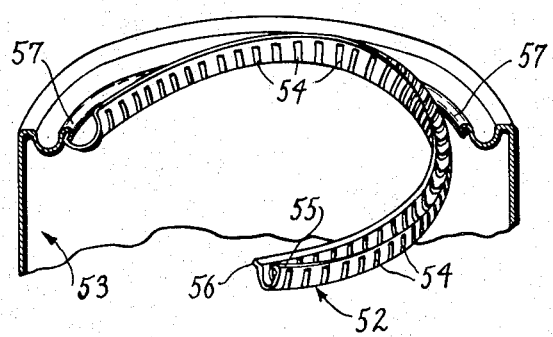
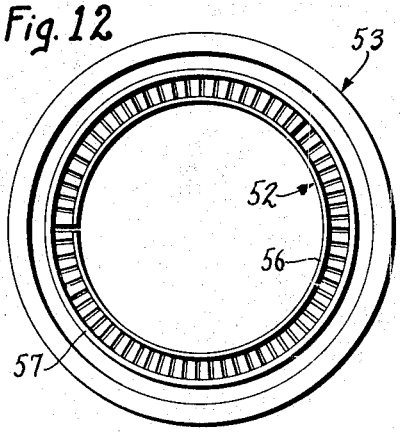
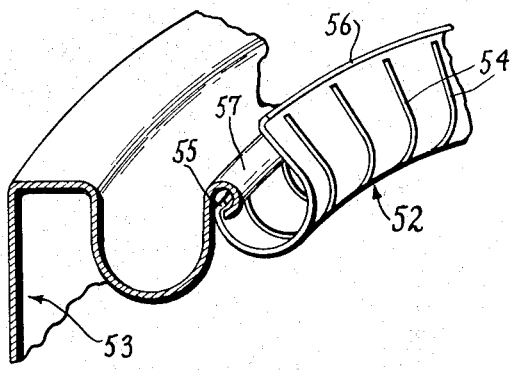
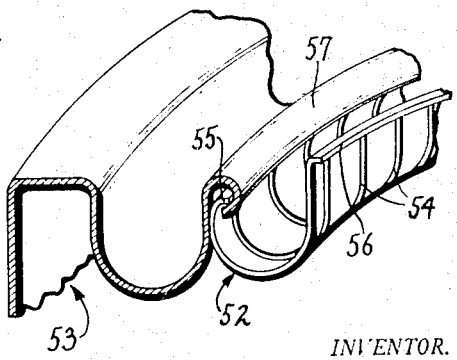

2,742,180
BRUSH WIPER
Stephen Miljevich, Downey, Calif.
Application May 31, 1951, Serial No. 229,206
1 Claim. (Cl. 220—90)

My invention relates to brush wipers, more particularly to wipers for use with paint cans, and the principal object of my invention is to provide new and improved wipers of this character.

Paint brush wipers of the prior art have not met with commercial success apparently because they were not readily accessible for cooperation with the brush and because they were attachments which were required to be positioned after the can is opened.

My invention provides a brush wiper that may be installed in the paint container prior to the time the container lid is secured in place, and such wiper may be shipped in stored relation in the container. Further, the wiper of my invention is automatically elevated to a convenient position for cooperation with the paint brush when the container lid is removed, and is automatically returned to stored relation within the container when the lid is replaced. Thus, a user is not required to handle the wiper after it has been initially installed in a container and therefore the wiper is never displaced nor are the user's hands subjected to any messy operations which were previously required in the handling of a wiper.

In the drawing accompanying this specification and forming a part of this application, there are shown, for purposes of illustration, several embodiments which my invention may assume, and in this drawing:

Figure 1 is a perspective view of an embodiment of my invention, the container being shown in dot-dash lines, Figure 2 is a fragmentary sectional view of the embodiment disclosed in Figure 1, showing the wiper in several positions, Figures 3, 4, 5 and 6 are perspective views of slightly different forms of the invention shown in Figures 1 and 2, Figure 7 is a perspective view of a container and wiper, showing another embodiment of my invention, Figure 8 is an enlarged, fragmentary sectional view corresponding generally to the line 8—8 of Figure 7, Figure 9 is an enlarged, fragmentary sectional view of another embodiment of my invention, Figure 10 is a view similar to Figure 9 but showing certain parts in another position, Figure 11 is a fragmentary perspective view of another embodiment of the invention, the container being shown in section, Figure 12 is a reduced size plan view of the embodiment shown in Figure 11, Figure 13 is an enlarged, fragmentary sectional view of the embodiment shown in Figures 11 and 12, illustrating an assembly operation, and Figure 14 is a view similar to Figure 13 but showing parts assembled.

The embodiment of the invention disclosed in Figures 1 and 2 comprises a member 10 adapted to be disposed within a container 11 which may be of any standard construction, such as the ordinary paint can. It is presently preferred to form the member 10 of wire, and of a wire which possesses at least a certain amount of resiliency. As herein disclosed, the member is formed of a single length of wire, providing a pair of legs 12 which are longitudinally curved as shown, the lower extremities of the legs having inturned feet 13 which are joined in any suitable manner, such as by means of a spot weld 14.

The upper ends of the legs 12 are generally straight, as shown, and the upper extremities of such legs are bent laterally, as shown at 15, to form shoulders; bent upwardly as shown at 16; bent rearwardly in converging relation, as shown at 17; and the bight 18, forming the brush wiping portion, is generally rectilinear and extends between the bent portions 17.

The distance between the legs 12, 12 is less than the diameter of the mouth 19 of the container 11 so that the member 10 may be easily assembled and disassembled with respect to the container. On assembly, the legs 12, 12 are inserted into the container until the lower extremities of such legs, and the feet 13, engage the bottom wall of the container. The member 10 is so proportioned with respect to the container that the legs 12, 12 will have to be further bent by inward pressure on the member 10 in order that the latter may be moved to final assembly with the container.

Inward pressure on the member 10 should be sufficient to depress the shoulders 15, 15 below the under surface of the lid-receiving groove 20, whereupon the upper portion of the member may be shifted laterally to hook the shoulders under the lid-receiving groove.

Since the legs 12, 12 are flexed during assembly of the member 10, the feet 13, 13 are urged to engagement with the side wall of the container at its junction with the bottom wall, and the straight upper portions of the legs 12, 12 are urged to engagement with the side wall of the container at its upper end and in direct opposition to the feet 13, 13. Thus the member is securely held in position within the container and the upper ends of the legs 12, 12 because of the flexed condition of the legs, are urged in an upward direction so as to yieldably force the shoulders 15, 15 against the under surface of the lid-receiving grove 20, and this is the position of parts with the lid of the container in removed relation.

As best seen in Figure 2, the bight 18 of the member 10 is disposed slightly above the upper end of the container so as to be readily accessible for wiping engagement with a paint brush, the excess paint wiped from the brush falling back into the interior of the container. It is preferable to wipe the brush from right to left, as viewed in Figure 1, and wiping action of the brush causes the side bristles to engage with one or both of the converging parts 17, 17 (depending upon the width of the brush) so that such bristles are also squeezed sideways to further remove excess paint and to prevent fraying or frazzling of such side bristles.

The lid 21 may be replaced in sealing relation with the container without necessitating the handling of the member 10. As the lid is moved to sealing relation with the container, the under surface of the cover portion of the lid engages the bight 18 of the member 10 and a slight downward pressure on the lid causes the upper portion of the member 10 to be moved downwardly. When the lid is in sealing relation on the container the upper portion of the member 10 is entirely within the container, as shown in dotted lines in Figure 2, with the bight 18 spring-pressed against the cover portion of the lid and the shoulders 15, 15 spaced from engagement with the under surface of the lid-receiving groove 20. When the lid 21 is subsequently removed, the upper portion of the member 10 will be automatically spring-pressed to position shown in full lines in Figure 2, the shoulders 15, 15 again engaging the under surface of the lid-receiving groove to limit outward extension of the member.

The constructions shown in Figures 3 and 4 are substantially similar to the construction heretofore described and like reference numerals will be used to designate like parts. In the construction shown in Figure 3, the converging parts 17, 17 are omitted, whereas in the construction shown in Figure 4 the bight 18 is of arcuate formation.

In Figure 5, the wiper member 22 comprises a pair of legs 23 formed as reverse bends, the lower end of each leg being generally straight and having an inwardly turned foot 24. The upper end of each leg is generally straight, as shown at 25, each upper extremity thereof being inwardly bent, as at 26, and upwardly bent as at 27 to be joined by the generally rectilinear bight 28. The operation of the construction shown in Figure 5 is substantially like that previously described.

The construction shown in Figure 6 provides a pair of opposed brush wiper portions for a container, the construction being formed by two pieces of spring wire to form two connected members 29, 29a. The member 29 comprises a pair of feet 30, upright portions 31, horizontal portions 32, upright portions 33, shoulders 34, upright portions 35 and a curved joining bight 36. The member 29a comprises similar parts and corresponding parts are given the same reference number supplemented by the suffix "a." Each pair of feet 30, 30a is joined to form a unitary structure.

The construction shown in Figure 6 is sufficiently flexible to permit its easy assembly within a container. The feet 30, 30a are adapted to bear against the bottom of the container and the shoulders 34, 34a are adapted to be pressed against the under surface of the lid-seating groove by spring action of the legs of the unit.

The wiper 37 shown in Figures 7 and 8 is adapted to be formed of sheet material, such as metal, and is adapted for connection with the rolled edge 38 of a container 39. The wiper may be annular in formation so as to be completely encompassed by the mouth 40 of the container, or as herein shown it may be arcuate and fit only a portion of the mouth. In any event, the wiper 37 is preferably formed with an upright lip 41 which is received within the rolled edge and secured thereto by clamping pressure, such as exerted by crimping action of a pair of pliers.

As best seen in Figure 8, the wiper is trough-shaped in cross-section and the bottom of the trough is formed with a plurality of apertures 42. The trough construction provides a wiper edge 43 across which a paint brush may be wiped to remove excess paint, such paint collecting in the trough and draining back into the container through the apertures 42.

As seen in dotted lines in Figure 8, the wiper may be formed and connected to the container so that it is yieldably flexed to present the wiper edge 43 above the upper end of the container and readily accessible for wiping action with a brush. When the lid is replaced on the container, the cover portion of the lid presses the wiper edge 43 downwardly and maintains the wiper in position shown in full lines. It will be appreciated that if the wiper is of annular formation, it may be formed with suitable notch constructions to provide for flexing action.

At certain times it is undesirable to crimp the rolled edge of the can as shown and described with respect to Figure 8, and at such times, the following construction may be employed.

As illustrated in Figures 9 and 10, a wiper 44, similar to the wiper 37 shown in Figure 7, may be of annular or arcuate formation. The wiper 44 is trough-shaped in cross-section and provides an edge 45 across which the brush may be wiped, and an edge 46 which cooperates with a rolled edge 47 of a can 48. As shown in Figure 9, the wiper 44 may be inserted in the mouth of the can 48 in manner so the edge 46 of the wiper is disposed within the space formed by the rolled edge 47 of the can. The can 48 and the wiper 44 may now be placed between upper and lower die portions 49 (see Figure 9).

As the upper die is moved downwardly, it will strike an upstanding portion 50 of the wiper 44 and will flatten this upstanding portion against a surface 51 of the lower die. As clearly shown in Figure 10, the edge 46 will rotate as the portion 50 is flattened and thus effectively prevent the withdrawal of the wiper from the rolled edge 47.

As shown in Figures 11 through 14, an annular wiper 52 may be secured within the mouth of a can 53 entirely by hand and without deforming the cooperating rolled edge of the can. The wiper 52 may be formed of sheet material (preferably metal) and may be provided with a plurality of slots 54 to permit drainage of paint therethrough and to provide the wiper with the necessary flexibility. As best seen in Figures 11, 13 and 14, the wiper 52 is trough-shaped and is provided with an inwardly turned edge 55 and an outwardly turned edge 56. The outwardly turned edge 56 forms a wiping edge for a paint brush, and the inwardly turned edge 55 cooperates with a rolled edge 57 of the can 53 to hold the wiper 52 in place.

The wiper may be easily secured in the mouth of the can by twisting one end of the wiper so that the inwardly turned edge 55 may be slid under the rolled edge 57 of the can (see Figures 11 and 13). The process may be continued until the entire length of the wiper has been locked beneath the rolled edge 57. The wiper 52 will now be securely held under the rolled edge as is shown in Figure 14.

It will be apparent that the embodiments of the wiper disclosed in Figures 9 through 14 may each cooperate with the lid of the can in manner shown and described with respect to Figure 8.

From the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

In combination, a container for paint and the like having a shoulder surrounding its mouth and a cover for closing said mouth, a brush wiper element disposed within said container and formed from a resilient wire bent to provide a pair of legs which are compressed within the container with the lower ends thereof bearing against the container bottom at one side of the container, and the upper ends thereof resiliently pressed against an upper opposite side of the container and in a direction upwardly of said container, the upper ends of said legs being joined to laterally extending portions of said resilient wire which form abutments engaged under the container shoulder, and said abutments being joined to spaced-apart upwardly extending portions joined together by a cross-wise extending brush wiper portion, said upwardly extending portions being of greater length than the vertical distance between the container shoulder and a transverse plane defining the uppermost part of the container so that said brush wiper portion extends beyond said mouth and is limited in such extent by engagement of said abutments with the shoulder of said container, said brush wiper portion being engageable with a bottom portion of the container cover and being moved inwardly of the container when said cover is moved to mouth closing position and said abutments being retracted from engagement with said shoulder by such action, and said brush wiper portion being resiliently pressed to its outer position and automatically moved to such position when the container cover is subsequently removed.

References Cited in the file of this patent

UNITED STATES PATENTS

| | | |
|---|---|---|
| 575,013 | Taylor | Jan. 12, 1897 |
| 1,580,936 | Wansner | Apr. 13, 1926 |
| 2,320,262 | Campbell | May 25, 1943 |
| 2,342,454 | Coyliondro | Feb. 22, 1944 |
| 2,578,233 | Entsminger | Dec. 11, 1951 |
| 2,645,377 | Bosley | July 14, 1953 |